United States Patent Office 3,808,237
Patented Apr. 30, 1974

3,808,237
SUBSTITUTED EPOXY ETHANE POLYPHOS-
PHONIC ACIDS AND SALTS
Al F. Kerst, Littleton, Colo., assignor to Monsanto
Company, St. Louis, Mo.
No Drawing. Filed Apr. 13, 1970, Ser. No. 28,140
Int. Cl. C07f 9/38, 9/40
U.S. Cl. 260—348 R   8 Claims

ABSTRACT OF THE DISCLOSURE

New and useful substituted epoxy ethane polyphosphonic acids and salts and esters thereof as exemplified by the ester compound having the formula

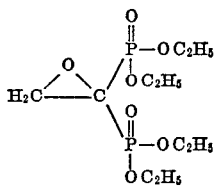

tetraethyl, epoxy ethane-1,1-diphosphonate and processes for preparing the same which generally comprise the "oxiranization" of a substituted ethene polyphosphonate having the formula

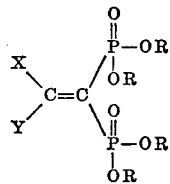

wherein X and Y are each hydrogen,

or organic radicals hereinafter defined and R is hydrogen, a metal ion, or an organic radical.

---

The present invention relates to a new class of substituted epoxy ethane polyphosphonate compounds and processes for preparing such compounds. More particularly, the present invention has as its primary object providing substituted epoxy ethane polyphosphonic acids as well as the salts and esters thereof, and processes for preparing the same.

According to the present invention, there is provided a new and useful class of substituted epoxy ethane polyphosphonate compounds corresponding to the following formula:

(I)
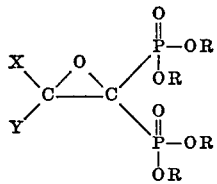

In the above Formula I, X and Y are each alike or unlike and are from the group hydrogen, alkyl containing from 1 to 30 (preferably 1 to 8 and more preferably 1 to 4) carbon atoms (including branch and straight chain members), phenyl, halogen (preferably chlorine, bromine, fluorine and iodine) substituted phenyl,

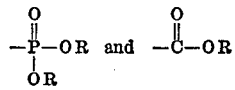

wherein R is hereinafter defined.

In Formula I, R is from the group metal ions, hydrogen, alkyl, alkenyl, aryl, alkyl aryl, cyclic and alicyclic. The aforementioned metal ions are from the group of metals alkali metals such as sodium, lithium and potassium, alkaline earth metals, such as calcium and magnesium, aluminum, ammonium, zinc, cadmium, manganese, nickel, cobalt, cerium, lead, tin, iron, chromium, mercury and amine. In particular, amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines. It is to be understood that the preferred metal ions are those which render the compound a water-soluble salt.

In conjunction with the foregoing general Formula I and more specifically when the substituted epoxy ethane polyphosphonate is in the ester form thereof, i.e. R is an organic radical heretofore mentioned, the preferred substituents are the following:

(a) alkyl—containing from about 1 to about 8 carbon atoms;
(b) alkenyl—containing from about 1 to about 18 carbon atoms;
(c) aryl—phenyl, naphthyl, anthryl, or phenanthryl;
(d) alkyl aryl—hydroxy, halogen, lower alkyl, (alkaryl) having from 1 to about 6 carbon atoms, and amino substituted phenyl, naphthyl, anthryl, or phenanthryl;
(e) cyclic—containing from about 4 to about 8 carbon atoms and there may be present in the ring either a nitrogen, sulfur, oxygen or phosphorus atom; and
(f) alicyclic—containing from about 4 to about 10 carbon atoms.

It is to be understood that all of the compounds falling within the above Formula I and as heretofore defined are generically described herein as "epoxy ethane polyphosphonates" or "EEPP." In other words, then, the acids, salts and esters and mixtures thereof are all generically described herein as epoxy ethane polyphosphonates or EEPP.

In conjunction with the generic Formula I, this includes, without limitation, the following sub-generic formulae:

II)
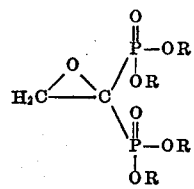

(III)
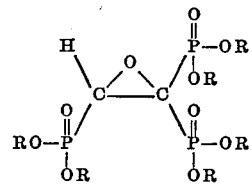

(IV) 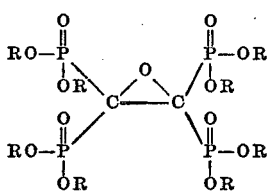

(V) 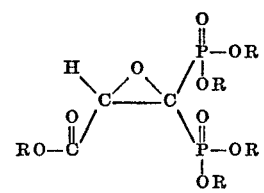

(VI) 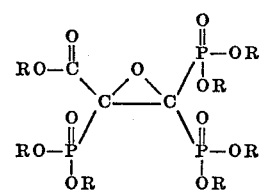

(VII) 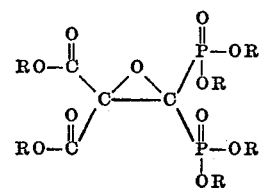

(VIII) 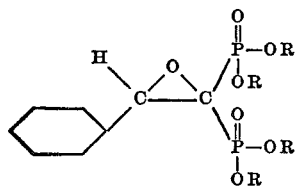

(IX) 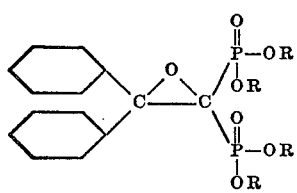

(X) 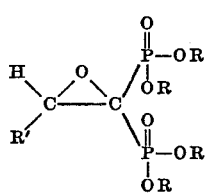

wherein R' is an alkyl group containing from 1 to 30 carbon atoms (XI) 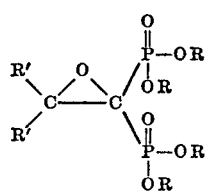

wherein R' is an alkyl group containing from 1 to 30, preferably 1 to 8 and more preferably 1 to 4, carbon atoms. It is to be understood that R' includes straight and branched chain lengths and isomers.

In general, the epoxy ethane polyphosphonates are prepared by contacting a substituted ethene polyphosphonate having the following formula:

(XII) 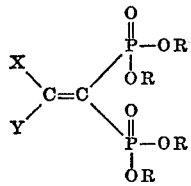

wherein X, Y and R are the same as defined above, with an epoxidizing agent, hereinafter defined, to form the epoxy ethane polyphosphonates falling within Formula I. It is to be understood that the term (substituted) "ethene polyphosphonate" used herein generically describes and encompasses the acid, salt and ester forms, and said term is designated at times herein "EPP" for the sake of brevity.

In accordance with the specific processes of this invention, the ethene polyphosphonate (EPP) is converted to the epoxy ethane polyphosphonate (EEPP) by reacting the former (EPP) with an epoxidizing agent (referred to herein also as an oxiranization agent) such as a peroxy compound from the group organic hydroperoxide, hydrogen peroxide, organic peracid or mixtures thereof. The organic hydroperoxides which are utilized in this invention are characterized by being liquid at the reaction conditions and by having a structure ROOH, wherein R may be alkyl, alkenyl, aryl, alkaryl, aralkyl, cycloalkyl, cycloalkenyl and similar radicals which also contain functional groups. Examples of such hydroperoxides which may be employed are tertiary butyl hydroperoxide, tertiary hydroperoxide, cumene hydroperoxide, tetralin hydroperoxide, α-hydro peroxy diisopropylketone, the hydroperoxide of 2-methylbutene-2, the hydroperoxide of octene-1, the hydroperoxide of 2,6-di-tertiary butyl paracresol, ethyl benzene hydroperoxide, cyclohexanone peroxide, methyl ethyl ketone peroxide, methyl cyclohexene hydroperoxide and the like, as well as the hydroperoxides of toluene, p-ethyltoluene, isobutyl benzene, di-isopropyl benzene, p-isopropyl toluene, o-xylene, m-xylene, p-xylene, phenyl cyclohexane, and the like. A useful organic hydroperoxide compound for use in this invention is the peroxide product which is formed by the liquid phase molecular oxygen oxidation of cyclohexanol.

Included among the various per acids which may be utilized are performic acid, peracetic acid, trifluoroperacetic acid, perbenzoic acid, and the like. In carrying out the processes of the present invention, the utilization of an epoxidizing agent such as hydrogen peroxide or peracetic acid is preferred.

Where one so desires, the epoxidation reaction of this invention can be carried out in the liquid phase in the presence of an effective dissolved catalytic amount of molybdenum, tungsten, titanium, chromium, tantalum, rhenium, selenium, columbium, zirconium, tellurium, uranium, or mixtures thereof in order to promote, for example, increased reaction rates. The catalysts are suitably added as compounds of the above. However, it is possible to add the catalyst as finely divided metal with the metal being divided to a compound sufficiently soluble to provide a catalytic amount of the metal in solution in the reaction mixture.

The amount of metal in solution used as catalysts in the epoxidation process can be varied widely, although it is desirable to use at least 0.00001 mole, preferably from about 0.002 to about 0.03 mole, per mole of the epoxidizing agent. Amounts as low as 0.000001 mole per mole of epoxidizing agent have an effect, while amounts greater than about 0.1 mole seem to give no advantage over smaller amounts, although amounts up to 1 mole per mole of epoxidizing agent can be employed.

For exemplary purposes only, the tungsten compounds, which are the preferred catalysts, include the oxides such as $WO_2$, $WO_3$, tungsten carbonyl, the tungstic acids such as ortho-tungstic acid ($H_2WO_4$), and metatungstic acid, the tungsten chlorides and oxychlorides, and tungstenfluoride, -bromide and -sulfide. Heteropolyacids containing tungsten can be used, as can salts thereof. Examples include phosphotungstic acids and the sodium and potassium salts thereof. Similar or analogous compounds of the other metals mentioned may be used, as may mixtures thereof. As a preferred embodiment of the present invention, sodium tungstate is desirably utilized as the catalyst.

Where one so desires, a solvent may be utilized in order to facilitate easier handling of the reaction medium, promote uniform temperatures and the like. The solvents which may be utilized in carrying out the epoxidation reaction of the invention include any inert, water-insoluble organic solvent (i.e., one having a solubility of not more than 2% by weight in water), such as aliphatic, cycloaliphatic and aromatic hydrocarbons or corresponding halogenated hydrocarbons and which have boiling points above the epoxidation reaction temperatures employed herein. Representative solvents which can be utilized include hexane, heptane, octane, isopropyl ether, cyclohexane, benzene, toluene, xylene, chloroform, methylene chloride, tetrachloroethylene, carbon tetrachloride, tetrahydrofuran, ethyl ether and the like. The use of a solvent in the epoxidation reaction will repress undesired opening of the oxirane ring, and when used at or close to its reflux temperature, the solvent serves as a heat reservoir for the exothermic reaction. The amount of solvent employed can vary and, functionally expressed, will be that amount sufficient to enhance the reaction rate and facilitate ease of product recovery. Generally, the amount of solvent employed will be from about 20 to about 200% by weight, preferably from about 50 to about 100% by weight, of the ethene polyphosphonate material.

In carrying out the aforementioned epoxidation, generally the reaction will be conducted at temperatures between about 0° C. and 100° C., and preferably from about 15° C. to about 75° C.; where it is desirable, higher temperatures such as up to about 180° C. can be utilized. It is also within the scope of the present invention process to utilize atmospheric, sub-atmospheric (e.g., ½ to 760 mm. Hg) or superatmospheric (e.g., up to 10 atmospheres) pressure. These epoxidation reactions can be carried out over a wide range of pH, e.g., at a pH of from about 2 to about 10, preferably from 5 to 10. Where necessary, alkali materials such as NaOH can be added to increase a low pH of the reaction mixture if one so desires.

The starting materials, which are to be epoxidized, i.e., the ethene polyphosphonate, can be prepared by the methods hereinafter described.

In conjunction with the starting material ethene diphosphonic acids and salts and esters thereof, i.e., (XII)

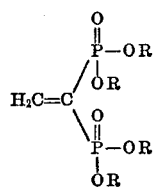

(which can be subjected to the epoxidizing processes heretofore mentioned in order to prepare the compounds falling within the above Formula II) these ethene (or ethylene) diphosphonic acids and salts thereof and processes for preparing the same are described in Canadian Pat. No. 811,736, which is incorporated herein by reference. The esters of ethylene diphosphonate, also sometimes referred to in the art as vinylidene diphosphonate, are disclosed in the literature as exemplified by U.S. 3,062,792, which is incorporated herein by reference.

The starting material, ethene (or ethylene) triphosphonic acids and salts and esters thereof, i.e., (XIV)

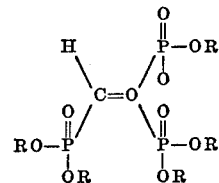

(which can be subjected to the aforementioned epoxidation process to yield compounds falling within the above Formula III) can be prepared by reacting the ethene diphosphonate (Formula XIII) with a halogen (Q, which is chlorine, bromine, iodine, and the like) in a reaction medium which is one of the organic solvents heretofore mentioned to form a dihaloethane diphosphonate. This dihaloethane diphosphonate is then reacted with an alkali metal (M=sodium, potassium, lithium and the like) diorgano phosphite contained in an organic solvent such as tetrahydrofuran (THF) to form a monohaloethane triphosphonate and an alkali metal halide precipitate which can be removed by filtration. This ethane triphosphonate can then be reacted with a tertiary amine, having the formula $(R')_3N$ wherein R' is the same as heretofore mentioned, such as triethyl amine to form the ethene triphosphonate. The equations for the reactions involved are as follows, wherein R has the same meaning as ascribed in the foregoing discussion:

(1) 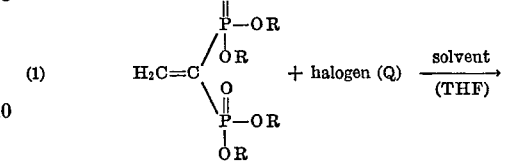

$QCH_2CQ(PO_3R_2)_2$ (2) $QCH_2CQ(PO_3R_2)_2 + $ 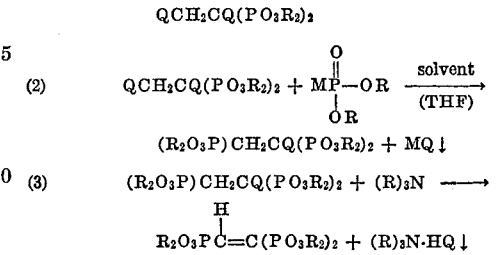

$(R_2O_3P)CH_2CQ(PO_3R_2)_2 + MQ\downarrow$ (3) $(R_2O_3P)CH_2CQ(PO_3R_2)_2 + (R)_3N \longrightarrow$ $R_2O_3P\overset{H}{\underset{}{C}}=C(PO_3R_2)_2 + (R)_3N\cdot HQ\downarrow$ It is to be understood that the solvents shown in the above equations are merely illustrative and not limiting. The above reactions can be carried out at temperatures of from about 0° C. to about 100° C., preferably from about 10° C. to about 80° C., and at atmospheric, subatmospheric (e.g., ½ to 760 mm. Hg) and super-atmospheric (e.g. up to about 10 atmospheres) pressure.

Where one so desires to form the ester of the epoxide falling within Formula III, the ethene triphosphonate (ester) (Formula XIV) may be directly reacted with the epoxidizing agent in the presence of trace amounts of a basic material such as sodium hydroxide. Where one so desires to form the epoxide material in the acid form, the ethene triphosphonate (Formula XIV) can be subjected to mineral acid (e.g., HCl, $H_2SO_4$ and the like) hydrolysis to form ethene triphosphonic acid, which can then be reacted with, for example, hydrogen peroxide in the presence of sodium tungstate to form the epoxy ethane triphosphonic acid. The salts thereof can be prepared by reacting the ethane triphosphonic acid with a weak solution of, e.g., sodium hydroxide or sodium bicarbonate.

The starting material, ethene tetraphosphonic acid and the salts and esters thereof, i.e., (XV)

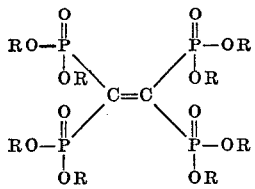

(which can be subjected to the aforementioned epoxidation processes to form the compounds falling within the above Formula IV) can be prepared by reacting a dihalo methylene diphosphonate with a monoalkali metal methylene diphosphonate in a reaction medium which is an organic solvent such as tetrahydrofuran (THF) to form a monohalo ethane tetraphosphonate and an alkali metal halide salt precipitate. (The dihalo methylene diphosphonate is disclosed in the art in the Journal of Organometallic Chemistry, vol. 13, pp. 199–207, which is incorporated herein by reference.) The tetraphosphonate is separated from said precipitate and then is reacted with a tertiary organo amine such as triethyl amine at reflux temperatures (e.g., 80° C.) to form the ethene tetraphosphonate. The equations for the reactions involved are as follows, wherein R has the same meaning as ascribed in the foregoing discussion:

(4) 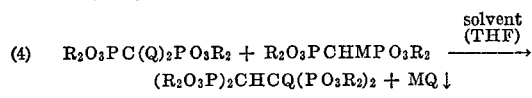

(5) 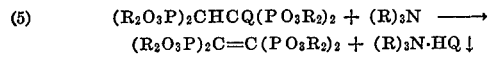

It is to be understood that the solvent (THF) shown in the above Equation 4 is merely illustrative and not limiting. The letters "Q" and "M" respectively connotate a halogen and an alkali metal as both are heretofore described. The above reactions can be carried out at temperatures of from about 0° C. to about 100° C. or higher, preferably from about 10° C. to about 80° C., and at atmospheric, sub-atmospheric (e.g. ½ to 760 mm. Hg) and super-atmospheric (up to 10 atmospheres) pressure.

Where one so desires to prepare the acid form of the epoxy ethane tetraphosphonate, it is desirable that once the ethene tetraphosphonate has been prepared, to subject this material to mineral acid hydrolysis to form the acid and then react the acid material, e.g., with hydrogen peroxide in the presence of a sodium tungstate catalyst. Where one so desires to prepare a sodium salt of the epoxy ethane tetraphosphonic acid, the reaction of said acid with an aqueous sodium hydroxide or sodium bicarbonate solution results in the formation of the sodium salts of epoxy ethane tetraphosphonic acid. Other salts may be prepared in a similar manner.

The starting material, the dicarboxy ethene diphosphonic acids and salts and esters thereof, i.e., (XVI)

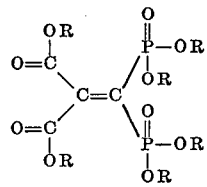

(which can be subjected to the epoxidizing processes heretofore mentioned in order to prepare the compounds falling within the above Formula VII) can be prepared by reacting a monoalkali metal methylene diphosphonate (known in the art as exemplified by U.S. 3,213,030 which is incorporated herein by reference) with a dihalomalonate in a reaction medium which is an organic solvent such as tetrahydrofuran (THF), chloroform, and the like, to form a monohalo-, dicarboxy ethane diphosphonate. This diphosphonate is separated from the alkali metal halide by-product (e.g., filtration) and then reacted with an organo tertiary amine such as triethyl amine for a sufficient period of time (e.g., 15 minutes to 15 hours) at reflux temperatures (e.g., 75° C.) to form the compounds falling within the above Formula XVI. The equations for the reactions involved are as follows, wherein R has the same meaning as ascribed in the foregoing discussion:

(6) 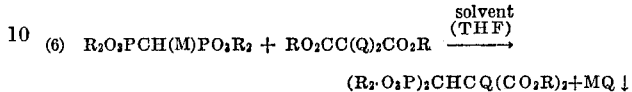

(7) 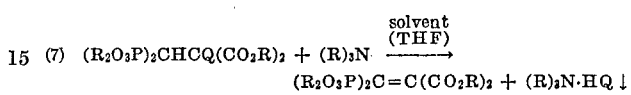

It is to be understood that the solvent shown in the above Equations 6 and 7 are merely illustrative and not limiting. The above reactions can be carried out at temperatures of from about 0° C. to about 100° C. or higher, prefererably from about 10° C. to about 80° C., and at atmospheric, sub-atmospheric (e.g., ½ to 760 mm. Hg) and super-atmospheric (e.g., up to about 10 atmospheres) pressure. The acids, salts or esters of the epoxidized form of the compounds falling within Formula VII can be prepared, preferably, by converting the dicarboxy ethene diphosphonate to the acid, salt or ester form via the methods heretofore mentioned prior to epoxidation.

The monocarboxy ethene diphosphonic acids, salts and esters, i.e., (XVII)

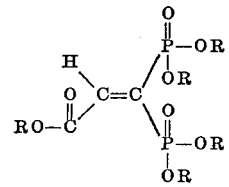

(which can be subjected to the aforementioned epoxidation processes to form the compounds falling within Formula V) can be prepared by reacting a monoalkali metal salt of methylene diphosphonate with a dihalo-carboxy methyl phosphonate in the presence of an organic solvent such as tetrahydrofuran (THF) followed by reaction with an organo-tertiary amine such as triethyl amine. The monoalkali metal salt of methylene diphosphonate can be prepared by reacting an alkali metal hydride with a methylene diphosphonate which is disclosed in the art in U.S. 3,213,030 which is incorporated herein by reference. The dihalo-carboxy methylene phosphonate can be prepared by reacting a carboxy methylene phosphonate with a halogen. The equations for the reactions involved are as follows, wherein R has the same meaning as ascribed in the foregoing discussion:

(8) 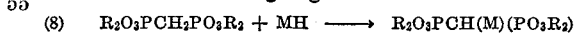

(9) 

(10) 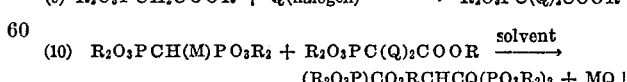

(11) 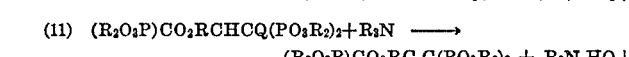

In the above equations M is an alkali metal such as sodium, potassium, lithium and the like and Q is a halogen such as chlorine, bromine, fluorine and the like. The above reactions can be carried out at temperatures of from about 0° C. to about 100° C. or higher, preferably from about 10° C. to about 80° C., and at atmospheric, sub-atmospheric (e.g., ½ to 760 mm. Hg) and super-atmospheric (e.g., up to 10 atmospheres) pressure. The acids, salts and esters of the epoxidized form of the compounds falling within Formula V can be prepared, preferably, by converting the monocarboxy ethene diphosphonate to the acid, salt or ester form via the methods heretofore mentioned prior to epoxidation.

In conjunction with the equations (8–11) and reactions and reaction conditions set forth immediately above, starting materials having the general formula (XVIII)     $ZWC=C(PO_3R_2)_2$ can be prepared by these same processes with the exception that in Equation 10 $R_2O_3PC(Q)_2COOR$ is replaced by a substituted methylene compound having the general formula (XIX)     $Z-C(Q)_2-W$ wherein Z is from the group hydrogen, $C_6H_5$, $C_6H_4Q$ and R', and W is from the group $C_6H_5$, $C_6H_4Q$, R' and $PO_3R_2$. In that latter formula, Q is halogen, R' is an alkyl group containing from about 1 to 30, preferably 1 to 8, carbon atoms, and R has the same meaning as heretofore ascribed.

As illustrative of the epoxy ethane polyphosphonates which can be prepared according to the aforementioned processes, there may be mentioned, without limitation, the following compounds:

(1)     $H_2C-\overset{O}{\underset{\phantom{O}}{\frown}}C(PO_3H_2)_2$ (2)     $H_2C-\overset{O}{\underset{\phantom{O}}{\frown}}C[PO_3(C_2H_5)_2]_2$ (3)     $H_2C-\overset{O}{\underset{\phantom{O}}{\frown}}C(PO_3Na_2)_2$ (4)     $H_2O_3P(H)\overset{O}{\underset{\phantom{O}}{\frown}}C-C(PO_3H_2)_2$ (5)     $[(H_5C_2)_2O_3P]HC-\overset{O}{\underset{\phantom{O}}{\frown}}C[PO_3(C_2H_5)_2]_2$ (6)     $(NaHO_3P)HC-\overset{O}{\underset{\phantom{O}}{\frown}}C(PO_3NaH)_2$ (7)     $ClH_4C_6(H)C-\overset{O}{\underset{\phantom{O}}{\frown}}C(PO_3H_2)_2$ (8)     $H_5C_6(H_2O_3P)C-\overset{O}{\underset{\phantom{O}}{\frown}}C(PO_3H_2)_2$ (9)     $H_3C(H_2O_3P)C-\overset{O}{\underset{\phantom{O}}{\frown}}C(PO_3H_2)_2$

(10)    $[(H_5C_2)_2O_3P]_2C-\overset{O}{\underset{\phantom{O}}{\frown}}C[PO_3(C_2H_5)_2]_2$

(11)    $HO_2C(H)C-\overset{O}{\underset{\phantom{O}}{\frown}}C(PO_3H_2)_2$

(12)    $(H_5C_2)O_2C(H)C-\overset{O}{\underset{\phantom{O}}{\frown}}C[PO_3(C_2H_5)_2]_2$

(13)    $(HO_2C)_2C-\overset{O}{\underset{\phantom{O}}{\frown}}C(PO_3H_2)_2$

(14)    $[(H_5C_2)O_2C]_2C-\overset{O}{\underset{\phantom{O}}{\frown}}C[PO_3(C_2H_5)_2]_2$

(15)    $(H_5C_6)_2C-\overset{O}{\underset{\phantom{O}}{\frown}}C[PO_3(C_2H_5)_2]_2$ In conjunction with the aforegoing equations numbered 2, 3, 4, 5, 6, 7, 10 and 11, it will be noted that in the respective equation either a metal halide precipitate or tertiary organo amine-hydrohalide precipitate is formed, as indicated by the vertical arrow pointing downward. In each of these equations, then, it is desirable to remove the precipitate from the reaction mass, for example, by conventional filtration, prior to conducting any further reaction steps.

It is to be understood that the solvents utilized herein in conjunction with the aforementioned Equations 1 through 11 are merely illustrative of the type of organic solvents utilized in the present invention processes. In this connection, however, the temperature at which the reactions are carried out are not limited by the solvent per se. For example, these reactions can be carried out under reflux conditions at temperatures above the boiling point of the solvent at super-atmospheric conditions. Where one so desires, however, sub-atmospheric conditions can be utilized and the reflux temperature decreased accordingly.

In accordance with the processes heretofore described in the "oxiranization" (epoxidizing) of the ethene polyphosphonate falling within Formula XII, it is to be understood that the resultant epoxy ethane polyphosphonate products, whether they be an isomeric mixture or a single compound, may be isolated from the resultant reaction mass through the use of conventional techniques such as solvent extraction, evaporation, centrifugation or the like, and further purified, if necessary, through re-crystallization, chromatography, molecular distillation or the like.

The aforedescribed new processes or "oxiranization" (epoxidizing) are unique in preparing the new and useful organophosphorus compounds, i.e., the epoxy ethane polyphosphonates of the present invention, since these processes, inter alia, represent inexpensive methods to manufacture said polyphosphonates, control reaction conditions, and produce high yields.

The acid and salt forms of the epoxy ethane polyphosphonates falling within Formula I of the present invention have unique utility in the field of treating water or aqueous systems and function as a sequestering agent and/or a "threshold" agent. It is to be understood that the term "threshold" as utilized herein refers to the chemical and/or physical phenomenon that less than stoichiometric quantities of the particular epoxy ethane polyphosphonate can effectively prevent the precipitation of various metallic ions such as calcium, iron, copper and cobalt. In other words, the "threshold" treatment of water is that technique by means of which less than stoichiometric quantities of the treating agent are added to interfere with the growth of crystal nuclei and thereby prevent the deposition of insoluble deposits. The term is applied, for example, to the treatment of water with polyphosphates and is discussed in references such as U.S. Pat. No. 2,038,316, and the article by Reitmeier and Buehrer in the Journal of Physical Chemistry, vol. 44, pages 535 to 574 (1939). An additional explanation of the threshold effect will be found in the publications of Hatch and Rice appearing in Industrial Engineering and Chemistry of January 1939, and August 1945. All of the aforementioned publications are to be considered as incorporated herein by reference.

The acid and ester forms of the epoxy ethane polyphosphonates falling within Formula I have unique utility in the field of flame retardancy for cellulosic materials and specifically function as flame retardants therefor.

In addition to the end-use applications set forth immediately above, the epoxy ethane polyphosphonates of the present invention represent new, unique organophosphorus structures which also can function as chemical intermediates in order to prepare other materials. In other words, the epoxy ethane polyphosphonates react with various organic and/or inorganic materials to form a variety of derivatives thereof, due to the fact that the "oxirane ring" can be broken to yield on the carbon atoms of the ethane portion highly reactive radicals or difunctional groups which in turn can be removed therefrom and/or coupled with other organic or inorganic radicals.

The following examples are presented to illustrate the invention, with parts and percentages by weight being used in the examples unless otherwise indicated.

EXAMPLE I

Into a reaction vessel equipped with a thermometer, pH electrode, mechanical stirrer and dropping funnel are charged 94 grams of ethene diphosphonic acid, 2.9 grams (0.01 mole) of sodium tungstate dihydrate and 200 milliliters of a 30% $H_2O_2$ solution. The resultant slurry, which has a pH of about 5, is heated to 60° C. and maintained at this temperature for approximately three hours with intermittent stirring. At the end of this time the reaction mixture is poured into 1500 ml. of acetone, giving an oil which solidifies on standing. The mother liquor is decanted off and the solid residue is dried for 48 hours at 35° C. in a vacuum oven maintained at ½ mm. Hg. The resultant dried material is a substantially white solid. $P^{31}$ and $H^1$ NMR analyses show that epoxy ethane 1-diphosphonic acid (herein designated as Compound No. 1) is produced.

The above Example I is repeated with the sole exception that the 94 grams of diphosphonic acid is replaced with 122 grams of tetraethyl ethene diphosphonate, $H_2CC[PO_3(C_2H_5)_2]_2$, dissolved in 500 milliliters of methanol. $P^{31}$ and $H^1$ analyses of the resultant reaction product show that tetraethyl epoxy ethane diphosphonate (herein designated as Compound No. 2) is produced.

The dibutyl ester is formed by reacting two molar equivalents of tributyl orthoformate with one molar equivalent of the ethene diphosphonic acid, followed by $H_2SO_4$ hydrolysis for a period of approximately 60 minutes and the aforementioned epoxidizing step. The tetrabutyl, tributyl and monobutyl esters of the epoxy ethane diphosphonic acid are also prepared as is shown by $P^{31}$ and $H^1$ NMR, elemental analyses and infrared analysis of reaction samples taken at different time levels during the aforementioned $H_2SO_4$ hydrolysis. In other words, the tetrabutyl ester is first formed by the reaction of the tributyl orthoformate with the ethene diphosphonic acid. During the subsequent acid hydrolysis, ester groups are removed to form the tributyl ester, the dibutyl ester and the monobutyl ester. The respective esters are then epoxidized as heretofore mentioned to form the respective ester epoxy ethane diphosphonate.

EXAMPLE II

Approximately 139 grams of the tetra sodium salt of ethene diphosphonic acid contained in 500 milliliters water is passed through a column of a strong cation exchange resin at an average rate of 130 grams per minute. This column, which is 2 inches in diameter and 34 inches high, consists of water-insoluble beads of the hydrogen or acid form of a strong cation exchange resin, which is commercially available under the trademark "Dowex 50," consisting of water-insoluble beads of a copolymer of styrene-AR-ethyl-vinyl benzene and divinyl benzene and which copolymer contains nuclear sulfonic acid groups and which copolymer is described in vol. 69, pages 28–30, of the Journal of the American Chemical Society (which is incorporated herein by reference), having a capacity of 4.25 milligram equivalents per gram. The aqueous solution containing the diphosphonate material is allowed to pass through said column until a composite effluent from the column is essentially free of sodium ions. This composite effluent is an aqueous solution containing ethane diphosphonic acid, i.e., in the acid form. This acid in solution is then subjected to the same epoxidizing process as described in Example I, and the aforementioned epoxy ethane 1-diphosphonic acid is produced. The tetrasodium salt of this epoxy ethane 1-diphosphonic acid (herein designated as Compound No. 3) is obtained by reacting 500 milliliters of a 4 N $NaHCO_3$ prior to the acetone addition. $P^{31}$ and $H^1$ NMR and elemental analyses show the formation of tetrasodium ethane 1-diphosphonate following the procedure immediately set forth above. The tetrapotassium salt is prepared by reacting four molar equivalents of KOH with one molar equivalent of said acid. The dizinic salt is prepared by reacting two molar equivalents of solid $Zn(OH)_2$ with one molar equivalent of said acid prior to the acetone addition.

EXAMPLE III

Into a reaction vessel such as that described in Example I are charged 122 grams of the tetraethyl ester of ethene diphosphonic acid and 500 milliliters of carbon tetrachloride. Over a period of approximately 60 minutes, 45 milliliters of liquid bromine are added to the reaction vessel through the aforementioned dropping funnel and during which time the contents therein are intermittently stirred. At the end of the 60 minute period, approximately 75 grams of diethyl monosodium phosphite contained in 200 milliliters of tetrahydrofuran are charged into said reaction vessel. The resultant slurry is allowed to settle for a period of approximately 30 minutes and a sodium bromide precipitate is removed by filtration and the filtrate charged back into the reaction vessel. Into the reaction vessel is then charged approximately 150 milliliters of triethylamine. After refluxing the resultant mixture for 4 hours at 80° C., a triethylamine hydrobromide precipitate is removed from the mixture by filtration. The filtrate, which contains hexaethyl ethene triphosphonate, is recharged into said vessel and is then subjected to the epoxidizing procedure set forth in Example I. $P^{31}$ and $H^1$ NMR and elemental analyses show that hexaethyl epoxy ethane diphosphonate (herein designated Compound No. 5) is formed.

EXAMPLE IV

Example III is repeated with the exception that with the formation of hexaethyl ethene triphosphonate, this material is subjected to sulfuric acid hydrolysis for a period of 60 minutes before the epoxidizing procedure heretofore mentioned, in order to form ethane triphosphonic acid. The resultant acid is then epoxidized via hydrogen peroxide in the manner heretofore mentioned, to form epoxy ethane triphosphonic acid (herein designated as Compound No. 4) as analyzed by $P^{31}$ and $H^1$ NMR and elemental analyses.

EXAMPLE V

Into the reaction vessel such as that described in Example I are charged 100 grams of tetraethyl dichloromethylene diphosphonate, 100 grams of tetraethyl 1-sodium methylene 1,1-diphosphonate, and 275 milliliters of tetrahydrofuran. The resultant slurry is stirred for approximately 5 minutes and then allowed to stand for approximately 45 minutes at 25° C. The sodium chloride precipitate is removed by filtration and the filtrate recharged into said reaction vessel. Approximately 200 milliliters of triethylamine is added to the reaction vessel and the resultant mixture refluxed for 3½ hours at 79° C. At the end of this period, a triethylamine hydrochloride precipitate is removed by filtration and the filtrate, which contains octaethyl ethene tetraphosphonate, is subjected to the epoxidizing procedure described in Example I with the exception that the epoxidizing agent is peracetic acid. $P^{31}$ and $H^1$ NMR and elemental analyses show octaethyl epoxy ethane tetraphosphonate (herein designated Compound No. 10) is formed.

EXAMPLE VI

Example V is repeated with the exception that with the formation of octaethyl ethene tetraphosphonate, this material is subjected to $H_2SO_4$ hydrolysis for a period of 85 minutes to form ethene tetraphosphonic acid. This acid is then epoxidized via peracetic acid in the manner heretofore mentioned. $P^{31}$ and $H^1$ NMR and elemental analyses show that epoxy ethane tetraphosphonic acid is formed.

EXAMPLE VII

Into the reaction vessel such as that described in Example I are charged 100 grams of diethyl 1-phenyl 1,1-dichloromethylene phosphonate (which is prepared by reacting liquid chlorine with phenyl methylene phosphonate), 100 grams of tetraethyl 1-sodium methylene 1,1-diphosphonate, and 250 milliliters of tetrahydrofuran. The resultant slurry is stirred for approximately 1 minute and then allowed to stand for approximately 15 minutes at 25° C. The sodium chloride precipitate is removed by filtration and the filtrate is recharged into the reaction vessel. Approximately 200 milliliters of triethylamine is added to the reaction vessel and the resultant mixture is refluxed for 5 hours at 76° C. At the end of this period, a triethylamine hydrochloride precipitate is removed by filtration and the filtrate, which contains hexaethyl, 2-phenyl ethene 1,1,2-triphosphonate, is subjected to the epoxidizing procedure described in Example I with the exception that the epoxidizing agent is cumene hydroperoxide. $P^{31}$ and $H^1$ NMR and elemental analyses show hexaethyl, 1-phenyl epoxy ethane 1,1,2-triphosphonate is formed.

EXAMPLE VIII

Example VII is repeated with the exception that, with the formation of hexaethyl, 2-phenyl ethene, 1,1,2-triphosphonate, this material is subjected to $H_2SO_4$ hydrolysis for a period of 55 minutes to form 2-phenyl ethene 1,1,2-triphosphonic acid. This latter acid is then epoxidized via cumene hydroperoxide in the manner heretofore mentioned. $P^{31}$ and $H^1$ NMR and elemental analyses show that 2-phenyl epoxy ethane, 1,1,2-triphosphonic acid (herein designated as Compound No. 8) is formed.

EXAMPLE IX

Example VIII is repeated with the sole exception that diethyl 1,1-dichloro ethane, 1-phosphonate is utilized in place of diethyl 1-phenyl, 1,1-dichloro methylene phosphonate. $P^{31}$ and $H^1$ NMR and elemental analyses show that 2-methyl epoxy ethane 1,1-diphosphonic acid (herein designated as Compound No. 9) is formed.

EXAMPLE X

Into the reaction vessel such as that described in Example I are charged 110 grams of diethyl 2,2-dichloromalonate, 106 grams of tetraethyl 1-sodium methylene, 1,1-diphosphonate, and 260 milliliters of tetrahydrofuran. The resultant slurry is stirred for approximately 25 minutes at 25° C. The sodium chloride precipitate is removed by filtration and the filtrate is recharged into the reaction vessel. Approximately 200 milliliters of triethylamine is added to the reaction vessel and the resultant mixture is refluxed for 6 hours at 80° C. At the end of this period, a triethylamine hydrochloride precipitate is removed by filtration, and the filtrate which contains hexaethyl 2,2-dicarboxy ethene 1,1-diphosphonate, is subjected to the epoxidizing procedure described in Example I. $P^{31}$ and $H^1$ NMR and elemental analyses show hexaethyl 2,2-dicarboxy epoxy ethane 1,1-diphosphonate (designated as Compound No. 14) is formed.

EXAMPLE XI

The above Example X is repeated with the exception that prior to the epoxidizing procedure, the hexaethyl 2,2-dicarboxy ethene 1,1-diphosphonate is subjected to $H_2SO_4$ hydrolysis for a period of 51 minutes to form 2,2-dicarboxy ethene 1,1-diphosphonic acid. This acid is then subjected to the hydrogen peroxide epoxidation procedure desribed in Example I. $P^{31}$ and $H^1$ NMR and elemental analyses show that 2,2-dicarboxy epoxy ethane 1,1-diphosphonic acid (herein designated as Compound No. 13) is formed.

EXAMPLE XII

Into the reaction vessel such as that described in Example I are charged 180 grams of diphenyl dichloromethylene (benzophenone dichloride), 96 grams of tetraethyl 1-sodium methylene 1,1 - diphosphonate, and 275 milliliters of tetrahydrofuran. The resultant slurry is stirred for approximately 30 minutes at 24° C. The sodium chloride precipitate is removed by filtration and the filtrate is recharged into the reaction vessel. Approximately 240 milliliters of triethylamine is added to the reaction vessel and the resultant mixture is refluxed for 5½ hours at 78° C. At the end of this period, a triethylamine hydrochloride precipitate is removed by filtration and the filtrate which contains tetraethyl 2,2-diphenyl ethene 1,1-diphosphonate, is subjected to the epoxidizing procedure described in Example I. $P^{31}$ and $H^1$ NMR and elemental analyses show tetraethyl 2,2-diphenyl epoxy ethane 1,1-diphosphonate (herein designated Compound No. 15) is formed.

EXAMPLE XIII

This example demonstrates one of the unique utilities of the compounds falling within Formula I and illustrates the sequestering ability of the acid and salt forms of the epoxy ethane polyphosphonates.

The testing procedure consists of pipetting an aliquot volume of 2.5% ferric chloride solution into a beaker and adding thereto enough sodium hydroxide or hydrochloric acid to give the desired pH. The solution is stirred for fifteen minutes, followed by the addition of an aliquot of 2.5% of the sequestering agent solution, i.e., the particular epoxy ethane polyphosphonate (in the salt form) dissolved in water. After final pH adjustment with sodium hydroxide or hydrochloric acid, the solution is shaken for 48 hours to reach equilibrium. The solution is then centrifuged at 12,000 r.p.m. for approximately 80 minutes to remove colloidal ferric hydroxide and an aliquot of the supernatant solution is titrated iodometrically or analyzed by X-ray fluorescence with use of an appropriate calibration curve in order to determine the ferric iron concentration. The ferric iron concentrations and sequestering agent concentrations found in parts per million (p.p.m.) are converted to a weight basis and expressed as pounds of iron sequestered by 100 pounds of sequestering agent.

Following the above-described procedure, each of the Compounds Nos. 1, 3, 4, 6, 7, 8, 9, 11 and 13 heretofore described and prepared according to the procedures outlined in this specification, including Examples I through XII, is individually tested. In each case it is found that the sequestering agents of the instant invention demonstrate a unique ability to sequester ferric iron over a wide range of pH conditions, i.e., from about 4 to about 10.5, and that the average amount (in pounds) of iron sequestered by 100 pounds of the respective sequestering agent (compound number) over the 4 to 10.5 pH range is 5, 4, 11, 8, 5, 6, 7, 9 and 10.

EXAMPLE XIV

The above Example XIII is repeated several times with the exception that other metal ion-containing solutions such as calcium, copper, nickel and chromium are utilized in place of the ferric (chloride) solution. In each case utilizing the aforementioned compounds the average sequestration values of these latter mentioned ions respectively are found to be similar to those set forth above.

EXAMPLE XV

This example demonstrates the utility of the esters of the epoxy ethane polyphosphonate compounds falling within Formula I. Approximately 50 grams of each of Compounds Nos. 2, 5, 10, 12, 14 and 15 heretofore described and prepared according to the procedures outlined in this specification, including Examples I through XII, are separately and individually mixed with an inert solvent in a 500 milliliter beaker, in this case carbon tetrachloride, in order to prepare a 10% by weight (solution or) slurry of each ester. After the separate slurries are pepared, a separate and individual swatch of a 3″ x 3″ undyed cotton cellulose is intimately contacted with each slurry by submerging such swatch in the slury for approximately five minutes. The separate swatches are withdrawn from the beakers containing these slurries (or solutions) and are dried for fifteen minutes in an oven which is maintained at a temperature of approximately 80° C. After a lapse of fifteen minutes at 80° C., the temperature is elevated and the swatches are then subjected to a temperature of approximately 150° C. for ten minutes in order to "set up" a reaction between the specific esters with the surface groups on the cotton cellulose.

The individual, dried swatches of "treated" cotton are individually tested for flame retardancy by positioning a swatch over a Bunsen burner. The flame is adjusted to a point at which the tip of the flame is approximately one inch beneath the cotton swatch and untreated cotton swatch is used as a control for comparative purposes. The flame underneath each of the individual cotton swatches (including the control) is maintained for approximately 35 seconds, and then is removed. Visual observations are made. The results show that the control sample, i.e., the cotton swatch which is not treated with any esters heretofore mentioned, is completely destroyed. However, with each of the individually treated cotton swatches, there is primarily only charring, and the flame on the material is extinguished within about 5 seconds upon the removal of the Bunsen burner away from the cotton swatches. Thus, it can readily be seen that one of the unique applications of the esters of the epoxy ethane polyphosphonates falling within Formula I is their use as a fire retardant for cellulose material, for example, cotton clothing.

What is claimed is:

1. An epoxy ethane polyphosphonate having the general formula

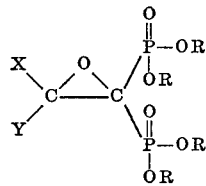

wherein X and Y are each like or unlike and are each selected from the group consisting of

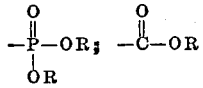

phenyl, halogen substituted phenyl, hydrogen and alkyl which contains from 1 to 8 carbon atoms; and R is selected from the group consisting of hydrogen, alkali metal ions, zinc and ammonia.

2. The polyphosphonate as set forth in claim 1 wherein X and Y both are hydrogen.

3. An epoxy ethane polyphosphonate having the general formula

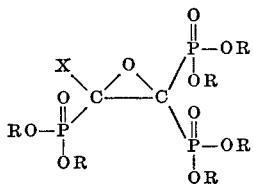

wherein X is selected from the group consisting of

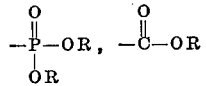

hydrogen, phenyl, halogen substituted phenyl, and alkyl which contains from 1 to 8 carbon atoms; and R is selected from the group consisting of hydrogen, alkali metal ions, zinc and ammonia.

4. The polyphosphate as set forth in claim 3 wherein X is hydrogen.

5. An epoxy ethane polyphosphonate having the formula

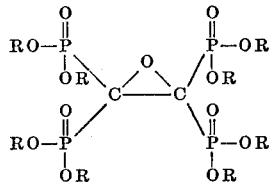

wherein R is selected from the group consisting of hydrogen, alkali metal ions, zinc and ammonia.

6. An epoxy ethane polyphosphonate having the formula

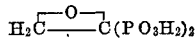

7. An epoxy ethane polyphosphonate having the formula

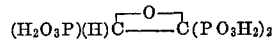

8. An epoxy ethane polyphosphonate having the formula

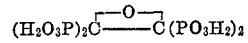

References Cited

UNITED STATES PATENTS

| | | | |
|---|---|---|---|
| 3,256,370 | 6/1966 | Fitch et al. | 260—932 |
| 3,400,148 | 9/1968 | Quimby | 260—932 |
| 3,451,937 | 6/1969 | Quimby | 252—152 |
| 3,496,080 | 2/1970 | Harris | 204—158 |
| 3,497,313 | 2/1970 | Quimby | 23—50 |
| 3,525,782 | 8/1970 | Jacques | 260—932 |
| 3,553,315 | 1/1971 | Francis | 424—49 |
| 3,579,570 | 5/1971 | Nicholson et al. | 260—932 X |

FOREIGN PATENTS

| | | |
|---|---|---|
| 1,046,047 | 12/1958 | Germany. |
| 811,736 | 4/1969 | Canada. |
| 1,525,038 | 4/1968 | France. |

OTHER REFERENCES

Chemical Abstracts, vol. 72 (1970), 132968t, abstracting Japan 70/9, 426, Apr. 6, 1970.

Russian Chemical Reviews, 37 (9), 1968, pp. 670–671.

NORMA S. MILESTONE, Primary Examiner

U.S. Cl. X.R.

8—116 P, Dig. 8; 210—58; 252—175; 260—932, 502.4 P